No. 725,953. PATENTED APR. 21, 1903.
W. G. GAUM.
REVERSIBLE AND VARIABLE FRICTION GEAR.
APPLICATION FILED FEB. 7, 1903.
NO MODEL. 2 SHEETS—SHEET 1.
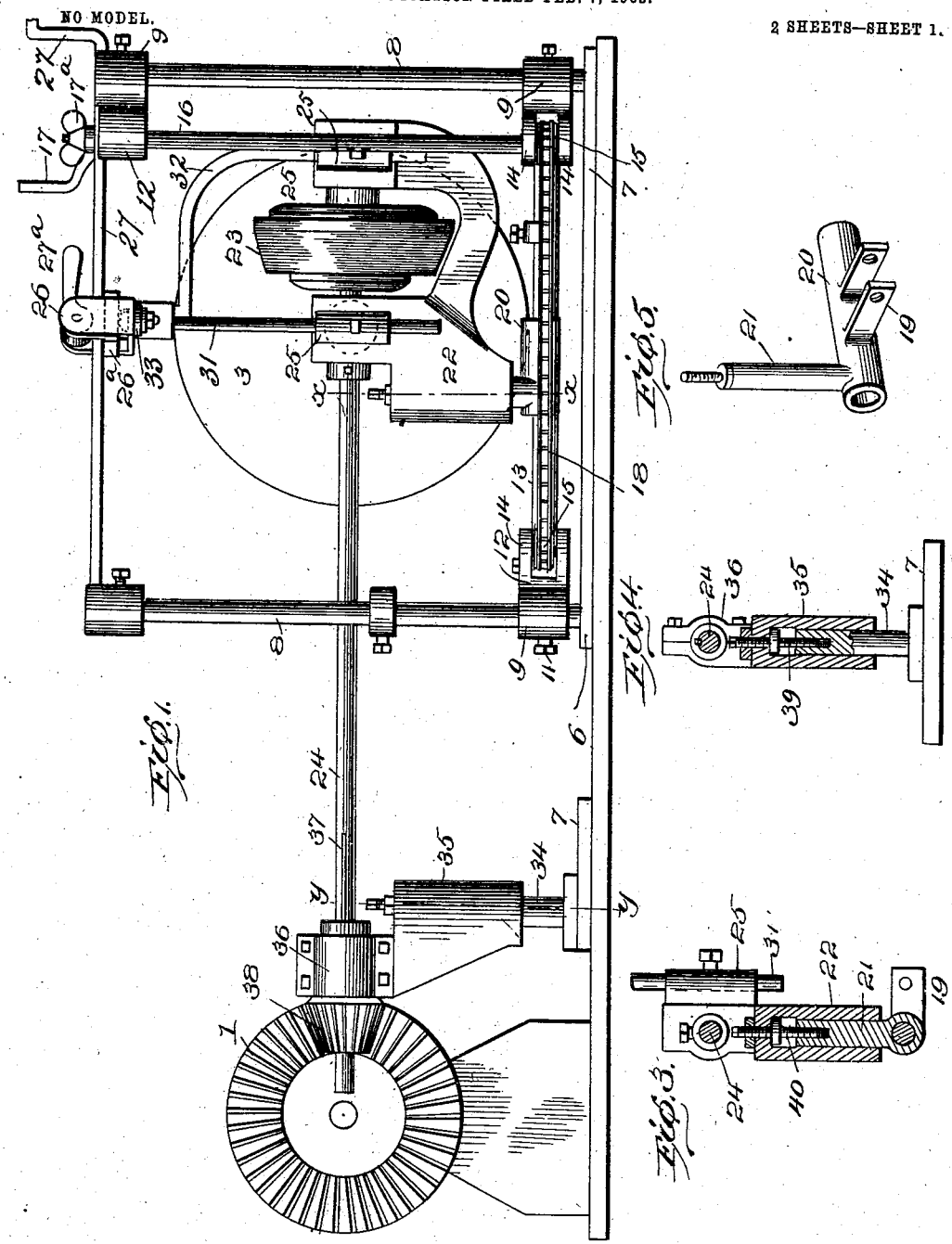
Witnesses
J. M. Fowler Jr.
L. H. Thaden
Inventor
William G. Gaum
By C. J. Bell
Attorney

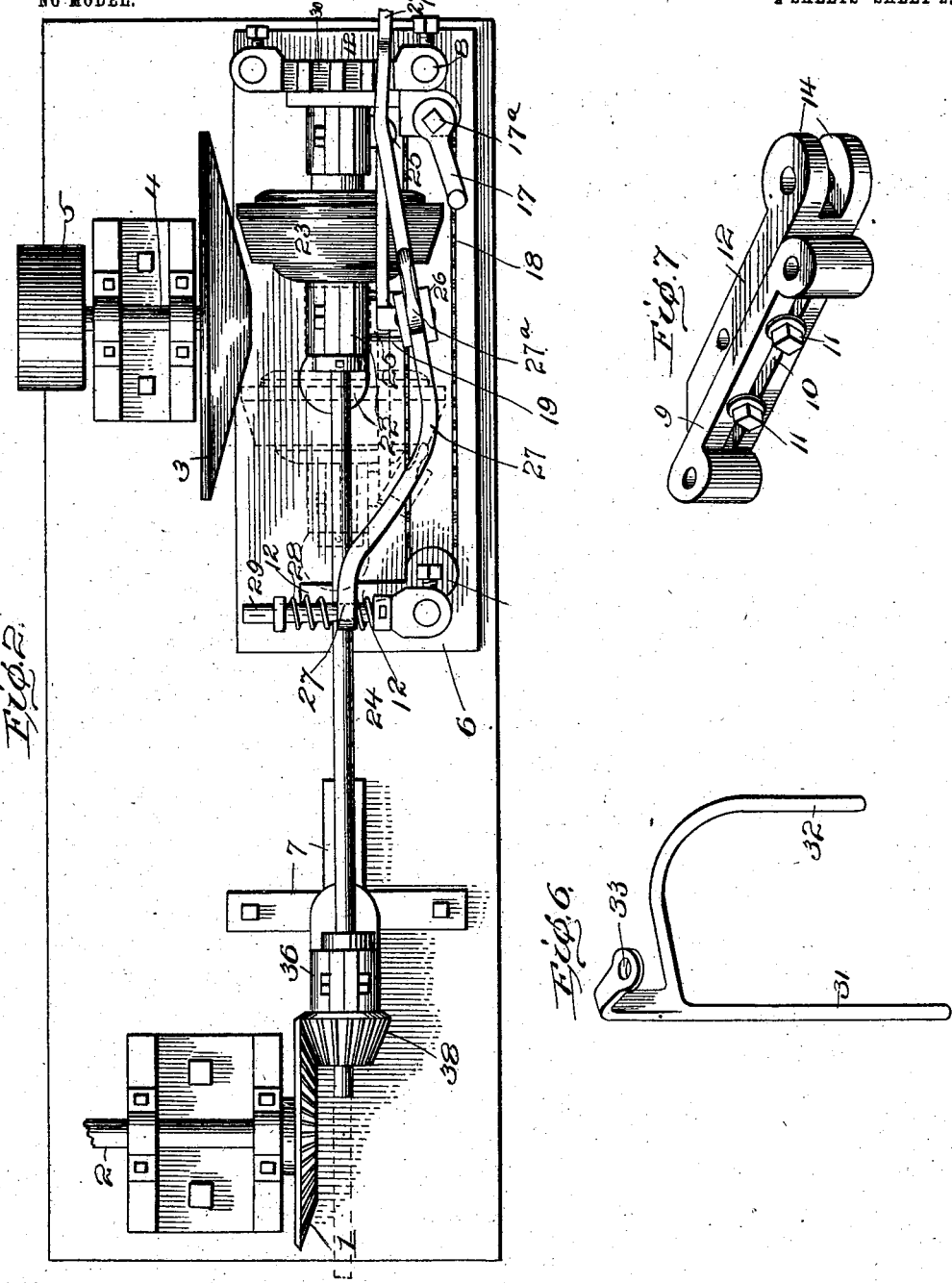

UNITED STATES PATENT OFFICE.

WILLIAM G. GAUM, OF PANTHER, WEST VIRGINIA.

REVERSIBLE AND VARIABLE FRICTION-GEAR.

SPECIFICATION forming part of Letters Patent No. 725,953, dated April 21, 1903.

Application filed February 7, 1903. Serial No. 142,371. (No model.)

*To all whom it may concern:*

Be it known that I, WILLIAM G. GAUM, a citizen of the United States, residing at Panther, in the county of McDowell and State of West Virginia, have invented certain new and useful Improvements in Reversible and Variable Friction-Gear, of which the following is a specification.

This invention relates to the class of machine elements, and pertains particularly to frictional gearing operated to vary the speed or feed of a machine and to reverse the feed.

The object of the invention is to provide a reversible feed and variable friction-gear of such novel and peculiar arrangement of parts that many improved results are attainable thereby in connection with various machines requiring change of speed or feed, and particularly with planing and like machines, to which my invention is especially applicable.

A further object of the invention is to provide certain new and novel means for operating a friction-wheel relative to a friction disk or cone and for operating on the cone to vary the speed and to reverse the feed of any machine to which my invention may be applied.

A still further object of the invention is to provide novel and peculiar details in the construction of certain parts, particularly in the parts for holding the friction-wheel shaft in pivoted position.

In the accompanying drawings, forming part of this application, Figure 1 is a side elevation. Fig. 2 is a top view showing the friction disk or cone and friction-wheel out of engagement. Fig. 3 is a section on the line $x\ x$, Fig. 1. Fig. 4 is a section on the line Y Y, Fig. 1. Fig. 5 is a perspective view of the slidable sleeve and sprocket-chain bracket. Fig. 6 is a perspective view of the connection between the friction-wheel hanger and its hand-lever. Fig. 7 is a perspective view of standard, slide, and sprocket-wheel bracket.

The same numeral-references denote the same parts throughout the several views of the drawings.

While my invention is applicable to various machinery, it is particularly so to planing-machines, and for this reason I will show the gear 1 on the feed-shaft 2 of a planing-machine and the friction-cone 3 on the shaft 4 of such a machine and adjacent to the driving-pulley 5. The device now to be described is operated in connection with the said gear 1 and cone 3, and as such elements vary in position, and particularly in height, in various machines the said device is made adjustable vertically from its base 6 and post-stand 7, which may be secured to the floor or base of whatever machine the device is applied to. Standards 8 extend vertically from the base 6 and have slides 9 adjustable thereon. The slides have a slot 10, by means of which and set-bolts 11 brackets 12 are adjustably secured thereto. Two of said brackets have the ends of a rod 13 secured therein and ears 14, in which are journaled sprocket-wheels 15. The other of said brackets forms a bearing for a rod 16, secured to one of the sprocket-wheels and provided with an upwardly-turned handpiece 17, held in adjusted position by a thumb-nut $17^a$. The handpiece is turned to operate the rod 16, and hence the sprockets, which have a suitable chain 18, secured to a bracket 19 of a sleeve 20, slidable on the rod 13. The sleeve 20 has a vertical stem 21, upon which is mounted and fixed thereto by a suitable nut or nuts the hanger 22 for the friction-wheel 23. This hanger is U-shaped, and its arms form journal-bearings for a shaft 24, upon which the friction-wheel 23 is fixed and revolved between the arms by said shaft. Each of said arms has a lug 25, in which is adjustably secured a connection, hereinafter to be more fully described, carrying a swiveled keeper 26, fitted with a seat $26^a$ for a hand-lever 27, controlled by a spring 28 on a pivoted arm 29 and held in adjusted position by a rack 30. The hand-lever is locked to the seat by a cam-lever $27^a$.

The connection between the lever 27 and the hanger 22 consists of two bars 31 and 32, diverging from an eye 33 and adjustably secured in the lugs 25 and the keeper 26, swiveled in the eye 33 and engaging the hand-lever 27.

The stand 7 has a post 34, upon which is mounted a pivot-sleeve 35, having a journaled bearing 36 for the shaft 24, which is provided with a key or feather 37 to permit the shaft to slide through the bearing and through a pinion 38, secured to the shaft by said feather and in mesh with the gear 1. The sleeve 35 is adjusted by the screw 39, and the stem 21 has a similar adjusting-screw 40.

It will be seen that the whole device may be adjusted vertically in a body as desired by simply raising or lowering the pivot-sleeve 35 on its post and by operating the slides. Then should further slight adjustment be required the wheel-hanger and the lever connection may be adjusted.

It is obvious that any movement of the hand-lever will be imparted to the shaft 24, and the latter is capable of pivot movement on the pivot-post sleeve without disengaging the pinion and gear.

In operation the handpiece 17 is turned to operate the chain and sprockets, which in turn slide the hanger, its friction-wheel, and shaft 24 to either contact the friction-wheel with the friction-disk or disengage them, as occasion may demand. In either position of the friction-wheel the contact or bearing of the said wheel on the disk may be adjusted by operating the hand-lever 27 to swing the hanger on the rod 13. To reverse the shaft 24, the handpiece 17 is operated to slide the hanger and the friction-wheel past the center of the friction-disk.

Having thus described my invention, what I claim as new, and desire to secure by Letters Patent, is—

1. In a reversing and variable-speed gearing, the combination, with a driving friction-disk, a driven friction-wheel, a slidable shaft having said wheel secured upon one end, a feed-gear and a pinion feathered to the other end and meshing with the feed-gear to permit the shaft to slide therethrough, of the slidable hanger for the friction-wheel and in which one end of the said shaft is journaled, a pivoted journal-bearing for the other end of the shaft, and manual means for sliding and swinging the said hanger to vary the relation of the friction wheel and the disk.

2. The combination, with a driving friction-disk, a friction-wheel driven by the disk, a hanger for the wheel, a shaft-bearing, a shaft journaled in the hanger and slidable in said bearing, and a pinion on the shaft, of a rod, a sleeve slidable on the rod and having a stem upon which the hanger is mounted, and manual means to slide the sleeve.

3. The combination, with a driving-disk, a shaft, a pinion feathered thereto to permit the shaft to slide therethrough, a friction-wheel secured to one end of the shaft and driven by the disk, a pivot-bearing for the other end of the shaft, and a hanger carrying the wheel and having the shaft journaled therein, of a rod, a sleeve slidable and turnable on the rod and having a stem upon which the hanger is mounted, a sprocket-chain connected to the sleeve, and the levers for sliding and turning the said sleeve.

4. The combination with the friction-wheel, the wheel-hanger, having lugs, and a spring-controlled hand-lever, of a connection adjustably secured in the said lugs, and a keeper swiveled to the connection and carrying the hand-lever.

5. The combination, with a driving friction-disk, a driven friction-wheel, and a shaft to transmit motion of the wheel, of the standards, the slides adjustable on the standards, the brackets adjustably secured to the slides, sprocket-wheels carried by the slides, a rod held by the brackets, a sleeve on the rod and having a stem, the wheel-hanger secured to the stem, a sprocket-chain connected to the sleeve to slide the latter, and means to operate the chain and sprockets.

6. The combination, with the friction-wheel, the pivoted wheel-hanger, and the wheel-shaft journaled at one end in the hanger, of the post, a sleeve loose upon the post and having a bearing for the other end of the said shaft to permit the hanger end of the shaft to be swung.

7. The combination, with the shaft, a friction-wheel secured to the shaft, the wheel-hanger having one end of the shaft journaled therein, and the standards, of means for vertically adjusting the wheel, shaft and hanger, comprising slides adjustable on the standards, a rod connecting the slides, and a sleeve on the rod and having a stem upon which the hanger is adjusted.

In witness whereof I hereunto set my hand in the presence of two witnesses.

WILLIAM G. GAUM.

Witnesses:
J. H. BIGGS,
JOHN C. BURCHETT.